United States Patent [19]

Moulin

[11] 4,190,868

[45] Feb. 26, 1980

[54] METHOD AND APPARATUS FOR AUTOMATICALLY INSCRIBING MAGNETIC MARKS ON A WIRELINE

[75] Inventor: Pierre A. Moulin, Chaville, France

[73] Assignee: Schlumberger Technology Corporation, New York, N.Y.

[21] Appl. No.: 843,603

[22] Filed: Oct. 19, 1977

[30] Foreign Application Priority Data

Oct. 26, 1976 [FR] France ..................... 76 32173

[51] Int. Cl.[2] ..................... G11B 5/00

[52] U.S. Cl. ..................... 360/1; 360/61

[58] Field of Search ..................... 360/1, 6, 61, 68, 66; 346/33 WL, 33 M, 33 P

[56] References Cited

U.S. PATENT DOCUMENTS

| | | | |
|---|---|---|---|
| 2,351,004 | 6/1944 | Camras | 360/66 |
| 2,441,065 | 5/1948 | Green | 360/1 |
| 2,623,805 | 12/1952 | Sewell | 360/6 |
| 2,655,633 | 10/1953 | Minor et al. | 360/6 |
| 2,894,796 | 7/1959 | Reynolds | 360/61 |
| 3,066,253 | 11/1962 | Bowers | 360/1 |
| 3,978,588 | 9/1976 | Richardson et al. | 360/1 |

FOREIGN PATENT DOCUMENTS

| | | | |
|---|---|---|---|
| 942869 | 11/1963 | United Kingdom | 360/40 |

*Primary Examiner*—Vincent P. Canney

[57] ABSTRACT

Method and apparatus for automatically inscribing magnetic marks on a moving wireline are disclosed. An alternating magnetic field is generated for application to a zone on the moving wireline. The marks are inscribed on the wireline by interrupting the field in response to a control signal corresponding to the time for a mark. The interruption is synchronized to alternations of the field and movement of the wireline. The interruption begins between alternations of the field and is maintained for a time sufficient for a predetermined length of the wireline to be moved beyond the application zone. This predetermined length is related to the length of the zone on the wireline affected by the alternating magnetic field, which is applied with a U-shaped electromagnet held in proximity to the wireline. Wireline movement pulses are generated by a tangentially coupled measuring wheel driving an encoder. The movement pulses are counted to determine the time for each mark and provide a control signal corresponding to a desired mark. The pulses are also used to determine when the predetermined length of wireline has been moved beyond the application zone and when the interruption of the field ends. Preferably, the field is restored starting with an alternation of a polarity related to the polarity of the field when it was terminated.

34 Claims, 3 Drawing Figures

METHOD AND APPARATUS FOR AUTOMATICALLY INSCRIBING MAGNETIC MARKS ON A WIRELINE

FIELD OF THE INVENTION

Method and apparatus for providing the automatic inscription of magnetic marks on a moving wireline, and more particularly, for providing the inscription of such marks on steel wirelines used for raising and lowering borehole tools in a borehole.

Magnetic marking of wirelines is commonly used for placing detectable reference marks on the wireline at some convenient interval such as every 100 feet. These marks may be manually placed at intervals determined by careful measurements made under controlled conditions, such as a constant tension of 1,000 pounds and a temperature compensated 100 ft. chain. The chain is used to initially place visible marks on the wireline over which a horsehoe-shaped permanent magnet is rotated around the wireline.

This manual operation has been largely superseded by automatic marking methods which provide the ability to determine the exemplified 100 ft. interval under variable conditions of tension and tangential coupling of a precision measurement wheel or wheels to the wireline, such as exist at the well site and therefore allow inscribing such marks while coming out of a borehole. Such techniques are described in U.S. patent applications Ser. Nos. 706,105 and 706,106 filed July 16, 1976 and U.S. Pat. No. 3,566,478 which issued Mar. 2, 1971 to D. F. Hurlston. As illustrated in FIG. 2 of these applications and in FIG. 1 of the patent, a coil 160 or 57, respectively, is wound around the wireline at a position which will allow the wireline to be magnetically erased prior to its movement under the magnetic mark inscriber located a short distance away. The erasing function is considered essential, not only to remove any prior magnetic marks which are no longer of value, but also to condition the wireline to enhance the recording and subsequent detection of the inscribed marks. This upstream position requirement of the erase coil relative to the magnetic mark inscriber limits the ability to mark the wireline to the direction which allows erasing prior to marking.

It is therefore an object of the present invention to provide method and apparatus for automatically inscribing magnetic marks on a wireline moving in either direction such that the wireline may be marked while descending into a borehole or coming out of a borehole.

Since the prior art erasing coil must be wound around the wireline, or the wireline fed through the coil at the beginning of the marking operation, it may readily be seen that the use of such an erasing coil is an operational disadvantage. The use of such a coil requires special care in installation of the coil around the wireline, and in maintenance of connections used to connect the ends of the coil to an oscillator or some other alternating current source. Further, the use of an erase coil tends to unduly increase the length of the marking apparatus, since the coil must be located a distance from the magnetic mark inscribing zone which is sufficient to ensure the magnetic field induced in the wireline by the erase coil will not weaken newly inscribed magnetic marks.

It is therefore a further object of the present invention to provide method and apparatus for automatically inscribing magnetic marks on a moving wireline which both erases and inscribes magnetic marks at the same zone on the wireline.

Conventional techniques for inscribing magnetic marks on a wireline use a coil wound around a U-shaped magnetic bar whose ends are arranged near the wireline. The coil is supplied with direct current for a short instant upon occurrence of a control signal to inscribe the magnetic mark on a previously erased section of the wireline. Since an alternating current is required for the erase coil and a direct current required for the magnetic mark inscription coil, both AC and DC supplies and associated circuitry are required in such prior art magnetic marking systems.

It is therefore a further object of the present invention to provide an automatic magnetic marking technique which requires only one type of current be supplied for both erasing the wireline and inscribing the marks.

When the prior art combination of a direct current supplied coil and a U-shaped magnetic bar is used to inscribe magnetic marks on the moving wireline, it will be apparent that the sharpness and definition of the magnetic mark so inscribed will become a function of a number of parameters comprising how fast the magnetic field can be created in the wireline and the speed at which the wireline is moving. Obviously, the faster the wireline is moving during such marking, the more the inscribed mark becomes blurred as the inscribing magnetic field changes are dissipated over a longer interval of wireline passing under the inscribing coil during the time required for switching the direct current on and off. Thus, the marks inscribed at higher marking speeds will be more difficult to detect compared to marks inscribed at lower speeds. It is desirable to have all marks inscribed with the magnetic field changes concentrated in as little wireline length as possible independent of wireline movement speed so that detection circuits may be adjusted for consistent detection of all such marks.

It is therefore a still further object of the invention to provide method and apparatus for automatically inscribing magnetic marks on a moving wireline which provide inscribed marks having uniformity not dependent upon the time required for direct current switching and the length of the wireline moved during the switching.

SUMMARY OF THE INVENTION

Accordingly, method and apparatus are described for automatically inscribing magnetic marks on a moving steel wireline used for raising and lowering borehole tools in a borehole comprising generating an alternating magnetic field which is applied to a zone on the moving wireline and interrupting, in response to a control signal, the alternating magnetic field for a time synchronized to the alternations of the field and measurement of movement of a predetermined length of the wireline past the zone to inscribe a magnetic mark on the wireline.

The predetermined length through which the wireline is moved during the interruption of the magnetic field is related to the length of the magnetic field in the wireline as determined by characteristics of a U-shaped electromagnet used to apply the magnetic field. The predetermined length should be sufficient to allow a small increment of wireline which has the magnetic mark inscribed thereon to move out from under and beyond the zone in the wireline affected by the field. Consequently, when the alternating magnetic field is restored, the mark inscribed on the wireline at the point of interruption of the field will not be erased.

The magnetic field is applied to the wireline as successively alternating half-cycles of positive and negative polarity and the interrupting of this field is synchronized to occur between these alternating half-cycles. Interrupting the field at this time leaves uniformly-sharp, permanently-inscribed magnetic marks on the wireline.

In one embodiment of the invention, the change in polarity of the alternating field is characterized as to the direction with which the field approaches and crosses through an intensity corresponding to zero magnetic field. The interrupting of the field is synchronized to occur approximately coincident with these zero crossings. In a further embodiment, the interrupting of the field is synchronized to occur approximately coincident with a crossing of the magnetic field through zero field in one direction. The restoring of the field may be synchronized to occur approximately coincident to when the restored field will cross through zero in an opposite direction. Thus, when polarities of the zero crossings are characterized as either a positive or a negative polarity crossing, the interrupting of the field occurs approximately on the next zero crossing with a predetermined polarity following the occurrence of a control signal corresponding to a magnetic mark. The restoring of the field occurs after a predetermined length of wireline has moved, by continuing from zero crossing of the opposite polarity. This provides for inscribing magnetic marks of uniform intensity and polarity.

In apparatus form, means are provided for generating and applying an alternating magnetic field to a zone on the moving wireline; a first control signal corresponding to a time for inscribing a magnetic mark; a second control signal corresponding to the movement of a predetermined length of wireline; and interrupting, in response to these control signals, the alternating magnetic field for a time synchronized to the alternations of the field and movement of the wireline.

The wireline is erased by movement through the field application zone during the presence of the alternating field. The magnetic mark is inscribed in response to the first control signal by the interruption of the field. This interruption is maintained for a distance sufficient to allow the point on the wireline at the zone where the field was applied prior to interruption to move out beyond the zone, as signaled by the second control signal, before the field is restored.

Since both the erase and mark functions are performed by the same magnetic field, separate erase and mark devices, and current supplies are not required, the length of the device is reduced and marking may be performed while moving the wireline in either direction.

Further features and advantages of the invention will become more readily apparent from the following detailed description when taken in conjunction with the accompanying drawings.

DESCRIPTION OF THE PREFERRED EMBODIMENTS

A conventional apparatus for erasing magnetic marks on a wireline comprises an erasing coil wound around the wireline. The wireline moves through the coil as it is continuously supplied with alternating current to produce an alternating magnetic field H which can be represented as a function of time by the curve 10 of FIG. 1. This alternating magnetic field extends on either side of the coil along the wireline with an amplitude which decreases as the distance from the coil increases. The part of the wireline located inside the coil presents an alternating magnetic induction B which, according to the magnetic field intensity H applied to the wireline, follows the hysteresis curve 11 shown in FIG. 1. When the wireline moves out beyond the coil, it is subjected to an alternating magnetic field whose peak-to-peak intensity H decreases and its magnetic induction B follows the dashed-line shown by curve 12 of FIG. 1. A demagnetization cycle is formed for a given point on the moving wireline by smaller and smaller amplitude hysteresis cycles, approaching zero as the point on the wireline moves farther and farther away from the coil. At a certain distance from the coil where the amplitude of the magnetic field is practically zero, all magnetization has disappeared from the wireline and previously existing magnetic marks in the zone affected by the field will be erased.

As described above, the use of an alternating magnetic field is a conventional erasing technique. It will be noted that erasing is effectively achieved only if the wireline is moved at least a certain distance away from the coil corresponding to its field limit.

Figure 1:
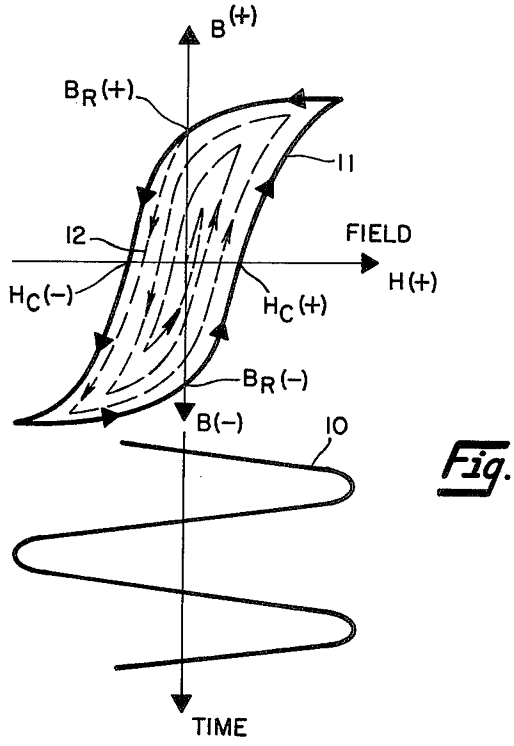
FIG. 1 represents an alternating magnetizing cycle useful for explaining the invention.

According to the present invention, an alternating magnetic field is applied to a zone on the moving wireline and this field momentarily interrupted while the wireline is still moving to inscribe a magnetic mark. Referring to FIG. 1, it is seen that, if the alternating magnetic field H is interrupted for an intensity value of H other than that of the coercive field $H_C$, the field required to end with zero residual flux, there will be a residual induction B and a corresponding residual magnetic flux in the wireline, corresponding to a magnetic mark. In particular, a substantial residual induction $B_R$ and a correspondingly sharp magnetic mark will be obtained if the magnetic field H is interrupted as its intensity goes through zero. It should be appreciated that to interrupt the alternating magnetic field at other than H=O would require use of a direct current to hold the field at that intensity.

To avoid erasing a newly inscribed magnetic mark, the alternating magnetic field must be re-established when this mark is moved some distance away from the coil. A small mark will remain even if this distance is small but the largest and sharpest marks will remain if this distance corresponds to the limit of influence of the erasing field. This distance may be experimentally predetermined for a given wireline, coil and AC supply.

Figure 2:
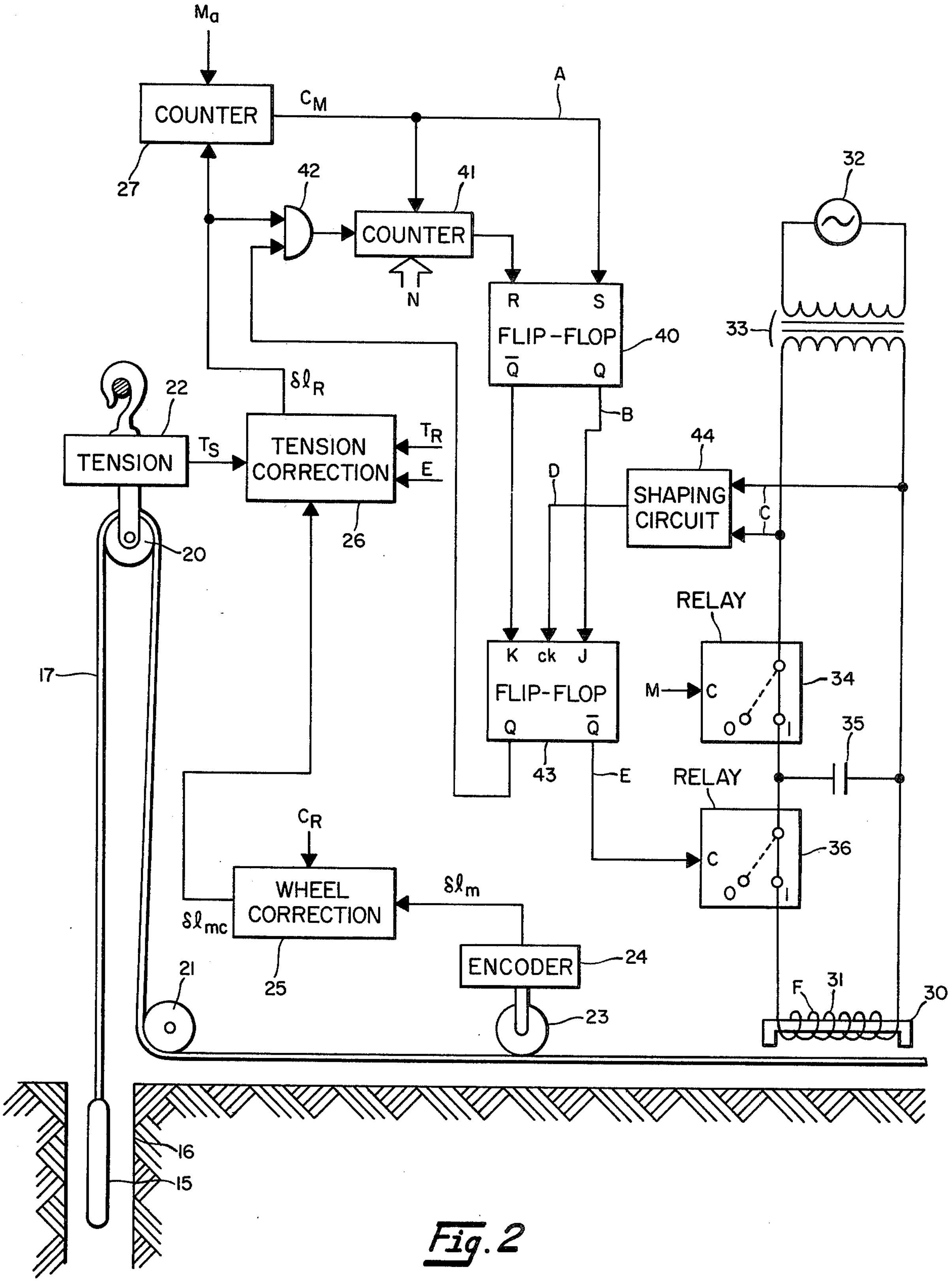
FIG. 2 represents a diagram of apparatus according to the invention for automatically inscribing magnetic marks on a moving wireline.

The apparatus for automatically inscribing magnetic marks in a moving wireline according to the invention is represented in FIG. 2. Referring to FIG. 2, a borehole apparatus 15, for example, a logging sonde, is suspended in a borehole 16 at the end of a wireline 17 which runs over sheaves 20 and 21 before winding on a winch (not shown). A tension measuring device 22 delivers a signal $T_S$ representative of the surface tension of the wireline and a tangentially coupled measurement wheel 23 associated with a photoelectric encoder 24 delivers pulses $\delta l_m$ representative of incremental movement of the wireline, typically one pulse every one-half inch. The wireline movement pulses $\delta l_m$ are applied to a correction circuit 25 which delivers movement pulses $\delta l_{mc}$ corrected by a coefficient $C_R$ according to the relationship $\delta l_{mc}=\delta l_m(1+C_R)$, the coefficient $C_R$ being, for example, a coefficient of calibration of the measurement wheel 23.

The pulses $\delta l_{mc}$ are then applied to another correction circuit 26 which delivers movement pulses $\delta l_R$ according to the relationship $\delta l_R=\delta l_{mc}+\delta l_{mc}(T_R-T_S)E$, in which E is the elastic elongation coefficient of the wireline and $T_R$ a signal representative of a reference tension. The movement pulses $\delta l_R$ are applied to a counter 27 which delivers a control signal $C_M$ whenever the counter 27 has totaled a predetermined number of movement pulses $\delta l_R$ corresponding, for example, to a length of a hundred feet. The counter 27 also comprises a manual control $M_a$ which makes it possible to deliver an initial control signal to initialize counter 27 and set flip-flop 40 at a chosen instant, such as at the start of the marking run. The $C_M$ control signal is used to signal the time for inscription of a magnetic mark on the wireline as will be explained below.

The above-mentioned circuits will not be described further because they are already described in detail in U.S. Application No. 706,105 filed on July 16, 1976 which issued as U.S. Pat. No. 4,117,600 on Oct. 3, 1978. The pulses $\delta l_m$, $\delta l_{mc}$ and $\delta l_R$ are in fact each made up of two series of pulses corresponding respectively to upward and downward movements of the apparatus 15, and the circuits are adapted to process these double series of pulses. To simplify the description, it will be assumed that these pulses correspond to upward movements and that the marking of the wireline takes place during the raising of the instrument. Naturally, this marking can be envisioned as intended for use with the present invention for wireline movements in both directions.

One means for generating and applying an alternating magnetic field to a zone on wireline 17 comprises a U-shaped magnetic bar 30 whose ends are arranged near two longitudinally-spaced points of the wireline. Around the magnetic bar 30 is wound a coil 31 to form an electromagnet. The terminals of coil 31 are connected to alternating current power supply 32 coupled through transformer 33. The supply 32 of alternating current AC is connected to the primary of transformer 33 whose secondary is connected via a relay 34 to the terminals of a capacitor 35. The terminals of the capacitor 35 are connected via a second relay 36 to coil 31. Relays 34 and 36 each comprise a full-cycle zero crossing switch or a triac associated with an appropriate circuit of the type described in U.S. Pat. No. 3,648,075 (Mankovitz). Such a relay, marketed, for example, by the Teledyne Company, has the property of responding to a "1" control signal by closing when alternating voltage applied to its terminals goes approximately through zero and responding to a zero "0" control signal by opening when the alternating current flowing through the relay goes through zero. If a control signal occurs at the instant of an alternating voltage zero crossing, the relay is not operated instantly but its closing will take place on the next zero crossing.

The relay 36 is used for interrupting the alternating magnetic field applied to the wireline to inscribe each magnetic mark. Interruption begins in response to a "0" control signal and ends in response to a "1" control signal on its control signal input C.

As long as relays 34 and 36 remain in their normally closed positions, a continuous alternating magnetic field is applied to a zone on the wireline immediately adjacent the electromagnet. When relay 36 is opened it interrupts the current to the electromagnet and the corresponding magnetic field in the wireline. Closing relay 36 restores the field. Since relay 36 has the property of opening and closing on the AC zero crossings of the AC supply, the interruptions of the alternating magnetic field are synchronized to correspond to the $H=0$ magnetic field intensity conditions already described in regard to FIG. 1. Synchronization with wireline movement will now be described.

The output of the counter 27 shown in FIG. 2 is connected to the setting terminal S of a flip-flop 40 whose resetting terminal R is connected to the borrow output of a counter 41. Each control signal $C_M$ sets the flip-flop 40 and produces the introduction of a number N into the counter 41. N corresponds to the number of incremental wireline movement pulses $\delta l_R$ equal to the previously described predetermined length preferred for an inscribed mark to be moved to prevent erasure. The pulses $\delta l_R$ are moreover applied to the subtract input of the counter 41 via an AND gate 42. Outputs Q and $\overline{Q}$ of the flip-flop 40 are connected respectively to the terminals J and K of a JK flip-flop 43 whose output Q is connected to the AND gate 42 and output $\overline{Q}$ to the control terminal of relay 36. The secondary of the transformer 33 is connected to the input of a shaping circuit 44 which delivers square-wave signals in phase with the output voltage of the secondary of the transformer 33. This square-wave signal is applied to the clock terminal ck of the JK flip-flop 43.

In operation, it is assumed that the wireline is moving, for example in the direction of the raising of the apparatus 15 in the borehole. The signal $\overline{Q}$ of the JK flip-flop is a level "1" and the relay 36 is closed. At the beginning of the marking operation, the relay 34 is closed by a suitable manual signal M such as also applied to counter 27. Alternating current then supplies coil 31 and bar 30 applies the resulting alternating field to the wireline 17 which erases any mark which may have existed on the wireline within the field affected zone.

Figure 3:
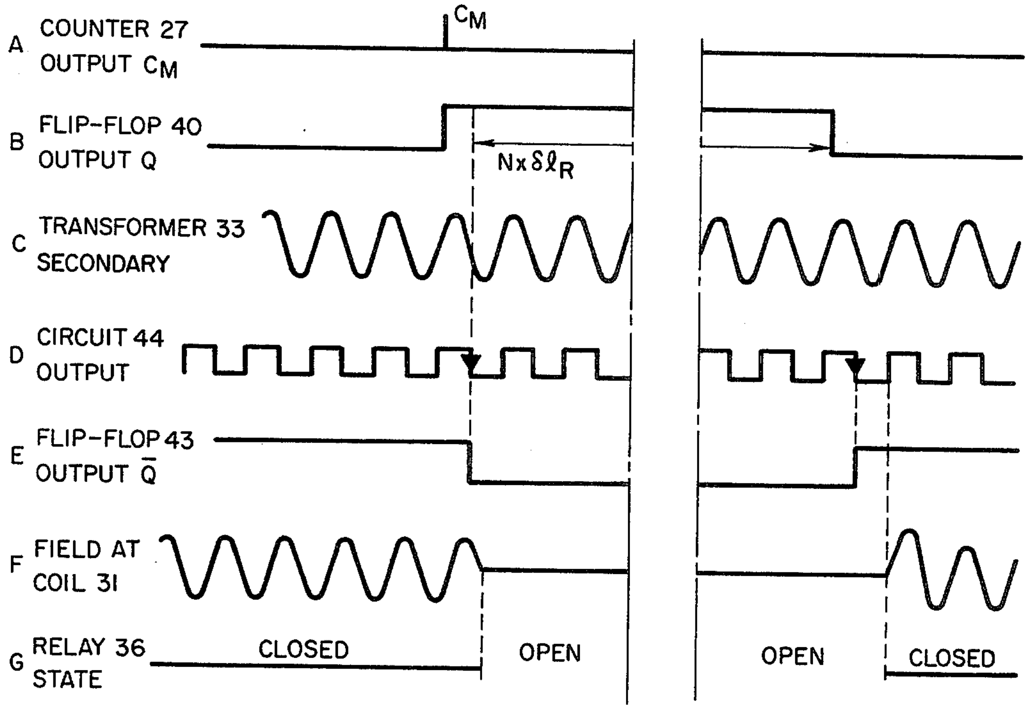
FIG. 3 represents the shape of signals at different points of the apparatus of FIG. 2.

To inscribe the first magnetic mark on the wireline, a manual control signal M is used to cause an initial control signal $C_M$ which sets the flip-flop 40 (FIG. 3, A and B). Simultaneously, the control signal $C_M$ enters the number N in the counter 41. At that instant the AND gate 42 is still inhibited by the output Q of the JK flip-flop 43 at level "0". As previously described, the number N is chosen so that N $\delta l_R$ pulses correspond to a predetermined length of wireline, for example 10 inches, which is the distance of influence along the wireline of the electromagnet made up of the bar 30 and the coil 31.

The shaping circuit 44 delivers a square-wave signal (FIG. 3 D) in phase with the alternating voltage at the terminals of the secondary of transformer 33 (FIG. 3 C). JK flip-flop 43 is adapted to be clocked by the descending edges of this square-wave signal and is thus triggered on the descending edge which immediately follows the setting of the flip-flop 40 (FIG. 3 E). At that instant, the output Q of flip-flop 43 goes over to level "1" and enables the AND gate 42. The pulses $\delta l_R$ applied to counter 41 decrement its contents (initially set to N) which, reaching zero, outputs a control signal which resets the flip-flop 40. The output $\overline{Q}$ of flip-flop 40, previously in level "0", then comes back to level "1" on the first occurring descending edge of the clocking signal D input to flip-flop 43 after the resetting of the flip-flop 40 (see right-hand part of FIG. 3, B to E).

The opening of the relay 36 is controlled by the passage of the control signal E of output $\overline{Q}$ of flip-flop 43 to a "0" level. However, as previously discussed, a certain delay occurs due to the fact that this relay is designed to open when the value of the alternating current in the coil 31 goes through zero (FIG. 3 E, F and G). The opening of relay 36 cuts off the current in the coil 31, and a magnetic mark is inscribed on the wireline in the form of a permanent magnet having a north pole and a south pole substantially opposite the ends of the magnetic bar 30. As the current is cut off when it goes through zero in a predetermined direction (from a positive value to a negative value) as clocked by the descending edge of shaped signal D, all the magnetic marks have the same polarity on the wireline and detection of the marks is thus facilitated.

A mark is not inscribed exactly upon the occurrence of the relay control signal changing from a "1" to a "0" level nor is the field restored exactly upon the occurrence of the relay control signal changing back to a "1" level. Examining FIG. 3, one sees that between signal $C_M$ and the inscription of the mark, there is a delay which may reach 1.25 voltage cycle of the power supply. Taking, for example, a 60-Hz power supply and a wireline speed of 100 feet/minute, the duration of 1.25 cycle corresponds to a wireline movement of less than one-half inch. The error on the location of the mark can thus reach one-half inch, which is permissible because it is not cumulative. A higher frequency supply could be used if desired to decrease this error.

The closing of relay 36 in response to a relay control signal takes place when the alternating voltage at the terminals of the relay goes through zero after the output $\overline{Q}$ of flip-flop 43 goes to a level "1". Thus, the current in the coil 31 is cut off when it goes through zero after a positive half-cycle and is restored when the voltage goes through zero after a negative half-cycle. This restoration takes place after wireline movement corresponding to N movement pulses, with the restoration beginning with a positive half-cycle (FIG. 3F). Therefore, the magnetic field of this first positive half-cycle has the same polarity as the magnetic mark previously inscribed by interrupting the field at a zero crossing after a positive half-cycle, and does not have a tendency to erase this mark.

After restoration of the alternating magnetic field, coil 31 and bar 30 again operate as an electromagnet and erase the wireline until the next control signal $C_M$. A magnetic mark is thus inscribed on the wireline substantially upon each occurrence of the control signals $C_M$.

When the marking operation is over, relay 34 may be opened and, to prevent a stray mark at this time, the oscillating circuit formed by the capacitor 35 and the coil 31 supplies an alternating current with a rapidly decreasing amplitude for a certain time. The decreasing alternating magnetic field thus created in the wireline prevents the inscription of an inadvertent mark at the end of the operation.

The apparatus just described of course lends itself to many variations without departing from the scope of the invention. For example, higher-frequency alternating fields and special designs for bar 30 could be used to reduce the predetermined distance the wireline is moved between the beginning and restoration of the field. Positive and negative polarities could be reversed and the field restored in a different manner such as, for example, by sensing the passage of a newly inscribed mark beyond the application zone for the erase field.

The above-described embodiments are intended to be exemplary and variations therefrom may be contemplated without departing from the scope and spirit of the invention.

I claim:

1. Method for automatically inscribing magnetic marks on a moving steel wireline used for raising and lowering borehole tools in a borehole at varying speeds, comprising:

generating an alternating magnetic field of successively alternating positive and negative polarity for application to a zone on said moving steel wireline; and interrupting in response to a control signal said alternating magnetic field at a time synchronized to begin between said alternations of the field substantially terminating the magnetic field applied to said steel wireline and restoring said magnetic field after a mechanically coupled measurement of movement of a predetermined length of said steel wireline past said zone to inscribe said magnetic marks on said steel wireline, said interrupting of said alternating magnetic field for said predetermined length measured independent of the speed of said moving steel wireline thereby inscribing uniform magnetic marks without generating an additional magnetic field during said interrupting.

2. The method of claim 1 wherein said predetermined length is related to the length of the zone on said wireline affected by said alternating magnetic field.

3. The method of claim 2 wherein said interrupting occurs approximately at the beginning of the next occurring half-cycle following the occurrence of said control signal.

4. The method of claim 2 wherein said successively alternating positive and negative polarity includes crossing through a zero magnetic field and said interrupting of said field begins approximately coincident with the zero crossing.

5. The method of claim 4, wherein said crossing is characterized as either a positive or negative polarity and said interrupting comprises interrupting said field approximately coincident to the next crossing of a predetermined polarity following the occurrence of said control signal.

6. The method of claim 4, wherein said crossing is characterized as either a positive or negative zero crossing and said interrupting comprises interrupting said field approximately coincident to a zero crossing of one polarity and restoring said field with a zero crossing of the opposite polarity.

7. The method of claim 6 wherein mechanically coupled measurement of said movement of a predetermined length begins with the interrupting of said field and said restoring occurs after said predetermined length of wireline has moved beyond said zone affected by said field.

8. Apparatus for automatically inscribing magnetic marks on a moving steel wireline used for raising and lowering borehole tools in a borehole at varying speeds, comprising:

means for generating an alternating current and applying said current to generate an alternating magnetic field having successively alternating positive and negative polarities to a zone on a moving steel wireline;

means for providing a first control signal corresponding to a time for inscribing a magnetic mark on said wireline;

means for providing a second control signal corresponding to a mechanically coupled measurement of the movement of a predetermined length of wireline; and means responsive to said first and second control signals for interrupting said generated field at a time synchronized to begin between the alternations of said alternating current substantially terminating said alternating magnetic field applied to said moving steel wireline after the occurrence of said first control signal and restoring said field after the occurrence of said second control signal corresponding to said movement of said steel wireline, said interrupting of said generated field for said predetermined length measured independent of the speed of said moving steel wireline thereby inscribing uniform magnetic marks without generating an additional field during said interrupting.

9. The apparatus of claim 8 wherein said predetermined length is related to the length of the zone on said wireline affected by said alternating magnetic field.

10. The apparatus of claim 9 wherein mechanically coupled measurement of said predetermined length begins with said interrupting of said field and results in said second control signal.

11. The apparatus of claim 10 wherein said means for interrupting the alternating magnetic field having successively alternating positive and negative polarities interrupts said field when said field has a given polarity.

12. The apparatus of claim 10 wherein said means for interrupting the alternating magnetic field having successively alternating positive and negative polarities interrupts said field on approximately one change in polarity and restores said field approximately on another change in polarity.

13. The apparatus of claim 12 wherein said one and another change in polarity are of opposite polarities.

14. The apparatus of claim 13 wherein said interrupting is synchronized to occur approximately at the next change to a given polarity following the occurrence of said first control signal and field restoration occurs with a change to a polarity opposite said given polarity following the occurrence of said second control signal.

15. Method for automatically inscribing magnetic marks on a moving steel wireline used for raising and lowering borehole tools in a borehole at varying speeds, comprising:

supplyling an alternating current for generating and applying an alternating magnetic field having successively alternating positive and negative polarities to a zone on said moving steel wireline; and interrupting said alternating current and said alternating magnetic field in response to a control signal beginning and ending approximately between alternations of said current substantially terminating the alternating magnetic field during the mechanically coupled measurement of the movement of a measured predetermined length of said steel wireline from a zone on said steel wireline affected by said alternating magnetic field, said interrupting of said magnetic field for said predetermined length measured independent of the speed of said moving steel wireline thereby inscribing uniform magnetic marks without generating and applying an additional magnetic field.

16. The method of claim 15 wherein said alternating current has successively alternating half-cycles of positive and negative polarity and said interrupting begins approximately at the next occurring half-cycle having a positive polarity following the occurrence of a control signal.

17. The method of claim 15 wherein said alternating current has successively alternating half-cycles which change from one polarity to another polarity and said interrupting begins approximately at a first occurring change from said one polarity to another polarity and ends approximately at a change from said another polarity to said one polarity.

18. The method of claim 17 wherein said changes in polarity correspond approximately to a zero intensity magnetic field.

19. The method of claim 18 wherein the time for ending said interrupting is determined by counting wireline movement pulses until a number of said pulses is accumulated corresponding to the measurement of said predetermined length of said wireline to synchronize movement of said wireline past said zone and prevent erasure of a mark inscribed by the interrupting of said field by restoring of said field.

20. Apparatus for automatically inscribing magnetic marks on a moving steel wireline used for raising and lowering borehole tools in a borehole at varying speeds, comprising:

means for supplying an alternating current for generating and applying an alternating magnetic field having successively alternating positive and negative polarities to a zone on said moving steel wireline; and means for interrupting said alternating current and said alternating magnetic field to inscribe a magnetic mark on said moving steel wireline in response to a control signal beginning and ending approximately between alternations of said current substantially terminating the alternating magnetic field during the mechanically coupled measurement of the movement of said mark on said moving steel wireline from the zone on said steel wireline affected by said alternating magnetic field as determined by measurement of said movement, said interrupting of said magnetic field for said predetermined length measured independent of the speed of said moving steel wireline thereby inscribing uniform magnetic marks without generating and applying an additional magnetic field.

21. The apparatus of claim 20 wherein said means for interrupting comprises means for stopping the flow of said current from generating said field when said alternating current is approximately crossing through zero in one direction when supplied with one control signal and restoring said flow when said current is approximately crossing through zero in another direction when supplied with a second control signal.

22. The apparatus of claim 21 wherein said means for stopping and restoring said flow comprises a switch which opens when said alternating current approaches a zero crossing in one direction when supplied with one control signal and closes when said alternating current approaches a zero crossing in the opposite direction when supplied with another control signal.

23. The apparatus of claim 22 wherein said one control signal corresponds to the time for inscribing a magnetic mark on said wireline and said other control signal corresponds to a time when a sufficient measured length of wireline has moved from said zone to insure restoration of said field will not erase said magnetic mark.

24. Apparatus for inscribing magnetic marks on a steel wireline used for raising and lowering borehole tools in a borehole at varying speeds, said apparatus comprising:

means including a coil for applying a magnetic field to a zone of the steel wireline;

means for supplying the coil with alternating current having successively alternating positive and negative half-cycles;

means for mechanically measuring movement of predetermined lengths of said steel wireline past the coil and generating first and second control signals; and means for momentarily interrupting the current in the coil in response to the first and second control signals so as to inscribe magnetic marks on the steel wireline by substantially terminating the applied magnetic field approximately synchronous to the occurrence of the mechanically measured movement of a predetermined length of the steel wireline and the successively alternating positive and negative polarities of the alternating current, said interrupting of said current in said coil for said predetermined length measured independent of the speed of said moving steel wireline thereby inscribing uniform magnetic marks without supplying additional current to said coil.

25. The apparatus of claim 24 wherein said means for applying a magnetic field to a zone of the wireline comprise a U-shaped magnetic bar around which is wound said coil, said bar having its ends arranged near two longitudinally-spaced points of the wireline.

26. The apparatus of claim 25 wherein said means for momentarily interrupting said current in said coil comprise means for cutting off said current approximately when its value goes through zero in response to the first of said control signals.

27. The apparatus of claim 25 wherein said means for momentarily interrupting said current in said coil includes means responsive to the measured movement of the steel wireline and generated first and second control signals for controlling a relay to interrupt said current in said coil substantially terminating said magnetic field in response to a first control signal and to re-establish said current in said coil in response to a second control signal, said second control signal signalling the mechanically coupled measurement of a predetermined length of wireline corresponding at least to the distance of influence of said means for applying the magnetic field.

28. The apparatus of claim 27 wherein said means for controlling comprise means connected to the power supply means of said coil to cause the interruption of said current approximately when its value goes through zero in a predetermined direction.

29. The apparatus of claim 28 wherein said means for controlling is adapted to reestablish the current in said coil when the voltage delivered by said power supply means goes through zero in the direction opposite said predetermined direction so that the first half-cycle of said current does not have a tendency to erase a previously inscribed magnetic mark.

30. The apparatus of claim 24 and further comprising means for momentarily interrupting said current at the end of the marking operation without however inscribing a magnetic mark on the wireline.

31. The apparatus of claim 30 wherein said means for momentarily interrupting said current at the end of the marking operation comprise a capacitor connected to said coil to generate a rapidly decreasing alternating current in said coil, and relay means for interrupting the power supply of said capacitor and of said coil.

32. Method for automatically inscribing magnetic marks on a moving steel wireline used for raising and lowering borehole tools at varying speeds in a borehole, comprising:

supplying an alternating current for generating and applying an alternating magnetic field having successively alternating positive and negative polarities to a zone on said moving steel wireline; and interrupting said alternating current and said alternating magnetic field to inscribe a magnetic mark on said moving steel wireline in response to a control signal, said interrupting beginning and ending approximately between alternations of said current substantially terminating the said alternating magnetic field during a mechanically coupled measurement of the movement of said mark on said moving steel wireline from a zone on said wireline affected by restoration of said alternating magnetic field, said interrupting of said magnetic field for said predetermined length measured independent of the speed of said moving steel wireline thereby inscribing uniform magnetic marks without generating and applying an additional magnetic field.

33. The method of claim 32 wherein said alternating current has successively alternating half-cycles of positive and negative polarity and said interrupting begins approximately at the next occurring half-cycle having a positive polarity following the occurrence of a control signal.

34. The method of claim 32 wherein said alternating current has successively alternating half-cycles which change from one polarity to another polarity and said interrupting begins approximately at a first occurring change from said one polarity to another polarity and ends approximately at a change from said another polarity to said one polarity.

* * * * *